Sept. 8, 1970  A. E. RATHBUN ET AL  3,527,499

SPRING SEAT FRONT EDGE CONSTRUCTION

Filed Dec. 4, 1968  2 Sheets-Sheet 1

INVENTORS
ALAN E. RATHBUN
DONALD W. BURTNER
BY Hamilton, Cook,
Renner & Renner
ATTORNEYS

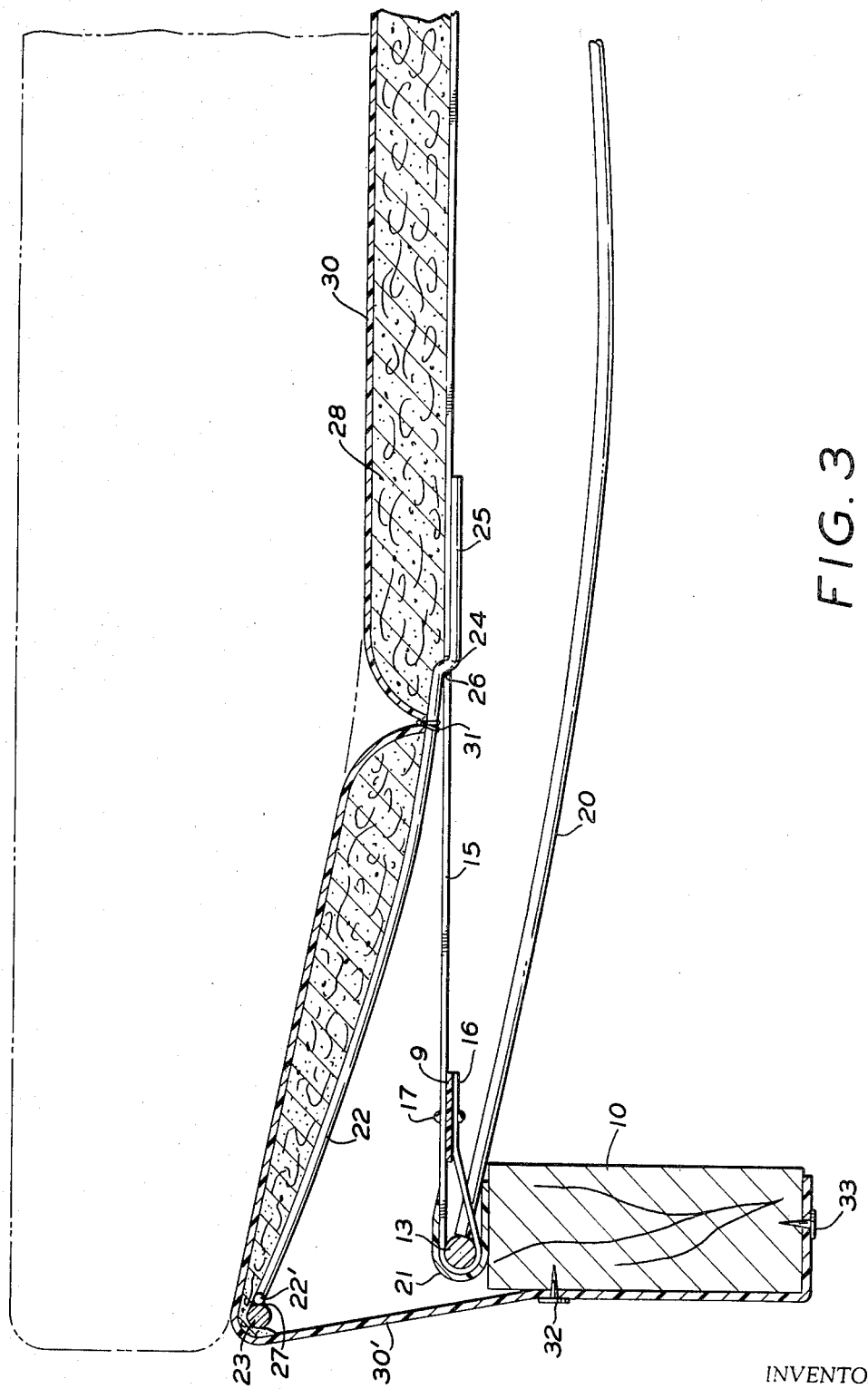

United States Patent Office 3,527,499
Patented Sept. 8, 1970

3,527,499
SPRING SEAT FRONT EDGE CONSTRUCTION
Alan E. Rathbun, 3135 Highland Drive, Cuyahoga Falls, Ohio 44224, and Donald W. Burtner, Newton Falls, Ohio; said Burtner assignor to said Rathbun
Filed Dec. 4, 1968, Ser. No. 781,144
Int. Cl. A47c 27/14, 27/22
U.S. Cl. 297—452                                    6 Claims

ABSTRACT OF THE DISCLOSURE

A spring seat suspension having front and rear frame rods supported on a base frame with spaced band means extending between and connected to said rods, at least one bowed compression spring rod extending between the frame rods with its ends abutting said rods, and a border wire above the front frame rod supported by supplementary spring wires atached at their inner ends to said band means.

BACKGROUND OF THE INVENTION

The invention relates to spring seat suspensions having raised slot front edges for use under seat cushions to provide increased comfort for the person sitting thereon, especially with respect to the support under the knees.

Spring seat suspensions having various kinds of springs, such as coil springs and sinuous wire springs, have been provided with raised front edges. These edges are sometimes supported by spring clips attached to the wire springs, by twisting the end of the clip or by welding, for example. Twisting the end of the clip provides an insecure connection which is apt to work loose, and welding the ends of the clips is an expensive operation.

In my U.S. Pat. No. 3,165,308, I disclosed a spring seat suspension having a spring frame formed of resilient rods with spaced strap means connecting two opposite rods, and at least one bowed spring rod under compression with its ends abutting said opposite rods, said frame rods being supported on a rigid seat frame.

SUMMARY OF THE INVENTION

It is an object of the present invention to provide an improved spring seat suspension having a raised soft front edge.

More specifically, it is an object to provide novel and improved front edge construction for a spring seat construction having front and rear spring frame rods with spaced straps or bands extending therebetween and at least one bowed compression spring rod with its ends abutting said frame rods.

The novel front edge construction attaining these objects preferably comprises supplementary spring wires having their inner ends attached to the spaced straps at points spaced inwardly of their front ends, and curving forwardly upward therefrom to angularly bent outer ends attached to a border wire defining a raised front edge.

DESCRIPTION OF THE DRAWINGS

FIG. 3 is an enlarged partial sectional view showing the spring seat and the front edge construction with padding and covering material applied.

DESCRIPTION OF THE PREFERRED EMBODIMENTS

Figure 1:
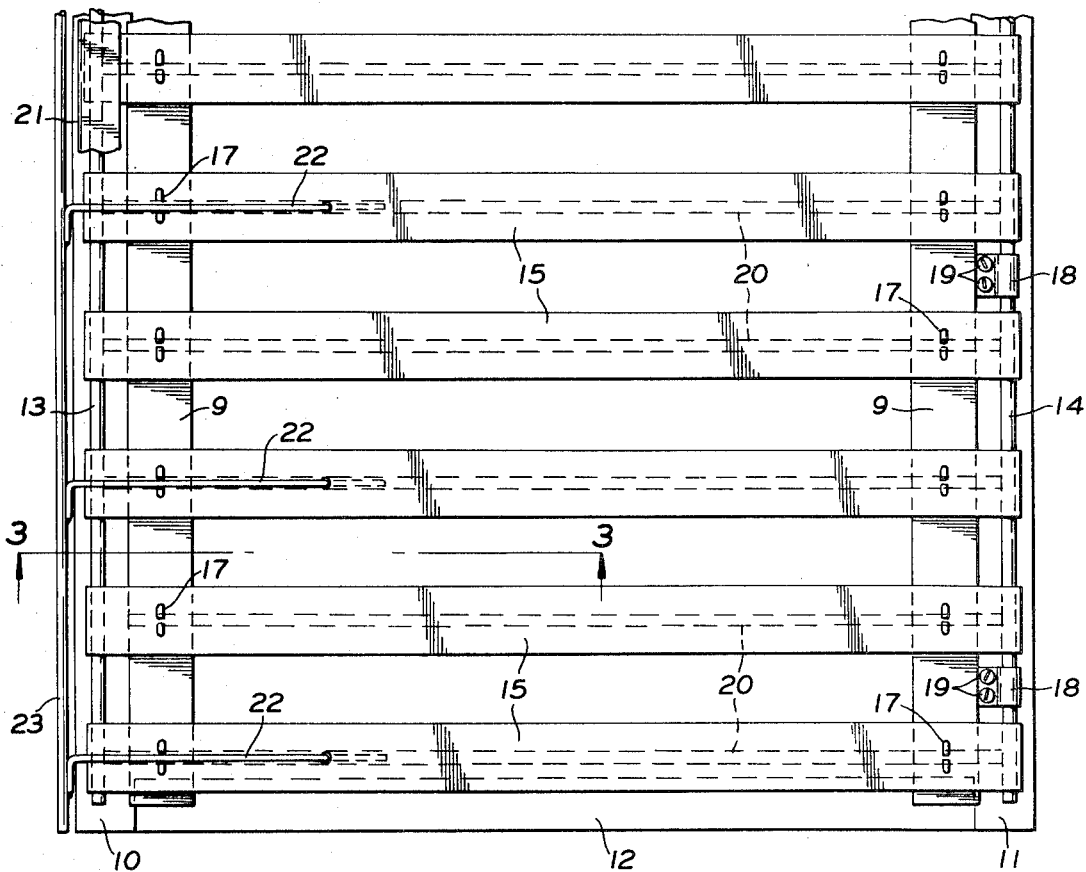
FIG. 1 is a plan elevational view of the spring seat suspension with the padding and covering removed, showing the front edge construction.
Figure 2:
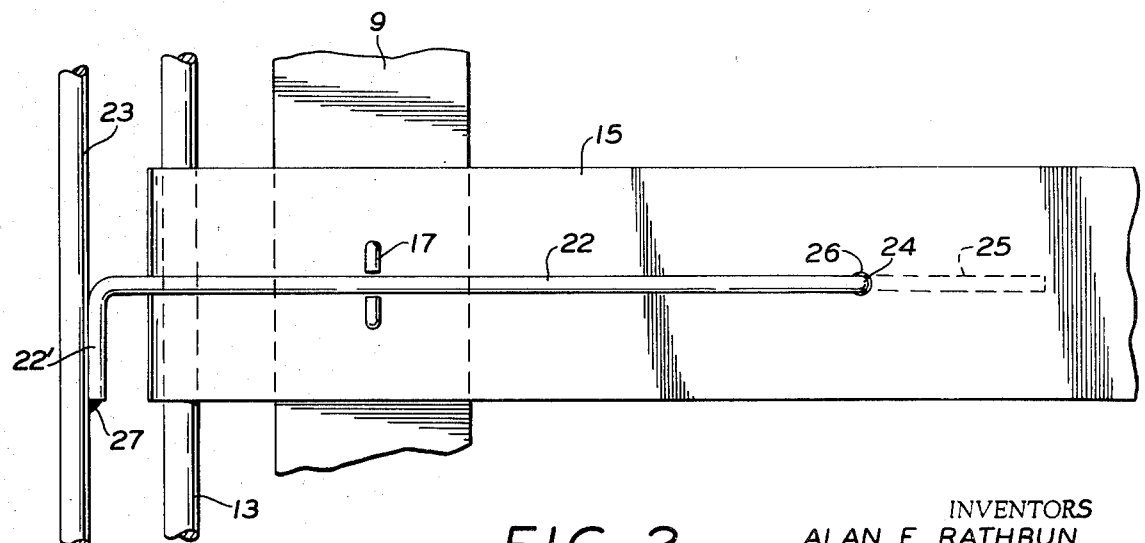
FIG. 2 is an enlarged partial plan elevational view.

The main spring seat suspension has a spring frame supported on a rigid base or seat frame including a front member 10 and a rear member 11. The seat frame may also have end members 12, one of which is shown in FIG. 1. The spring frame includes a front resilient rod 13 and a rear resilient rod 14. The rods 13 and 14 may be connected at their ends by end rods (not shown) but this is not essential.

Extending between the front and rear rods 13 and 14 are laterally spaced straps 15 of webbing material, preferably thin metal bands of tempered steel which are resilient and substantially non-extensible. The bands 15 have their end portions wrapped around the rods 13 and 14 with the underlapping portions 16 secured to the bands in a suitable manner, as by spot welding or by the staples 17, as shown. Obviously, the bands 15 may be otherwise arranged, as desired.

Preferably, longitudinal tapes 9 connect the spaced apart transverse bands 15 at their front and rear portions. The tapes 9 may be of suitable plastic material such as polyethylene, and may extend parallel to the spring frame rods 13 and 14 and between the overlapping portions of the bands 15 so as to be secured thereto by staples 17.

The spring frame may be of such length as to provide a single seating area, as in a chair, or it may be extended to provide a plurality of seating areas as in a sofa or davenport, or in an automobile seat.

The spring frame rod 14 may be fastened to the seat frame member 11 at intervals by suitable clips or brackets indicated at 18 which may be attached to the frame member 11 by screws 19 and have portions encircling the rod 14. This arrangement allows the portions of the rod 14 between the clips to flex slightly as a load is applied to the band 15. The front rod 13 merely rests on frame member 10 and is free to move laterally under load.

Bowed spring rod compression members 20 are provided at intervals along the spring frame rods 13 and 14, and extend transversely of the spring frame from front to back thereof. The ends of the compression rods 20 abut the front and rear rods 13 and 14 under sufficient compression to bow the rods as shown in FIG. 3, and the end portions of the rods may extend through openings in the overlapping portions 16 of the bands 15, or may be fitted into notches in the frame rods 13 and 14 or may be welded thereto. The spacing of the rods may vary from that of the bands, but there should be at least one bowed spring rod for each seating area.

Preferably, silencing channel strips 21 of suitable plastic material, such as polyethylene, are engaged around the front and rear edges of the spring frame and between the lapped portions of the bands and the seat frame. One of these channels is shown in FIG. 3. Such channels reduce squeaking or other noise caused by flexing of the spring suspension under load.

The bowed rods 20, under load, flex and cause controlled yielding movement to ward each other of the front rod and the portions of the rear rod between the clips 18. The seating load applied to the bands 15 causes them to sag slightly as controlled by the flexure of the bowed spring rods 20, thus providing a firmly comfortable support to persons seated thereon, and in the case of vehicle seating a minimum amount of side sway or pitching. For average seating loads, the frame rods 13 and 14 and the bowed spring rods 20 may, for example, vary from ⅛" to ⅜" in diameter.

The novel and improved front edge construction providing a raised soft front support includes a series of laterally spaced supplementary spring members, preferably wires or rods, 22, supported on their inner ends on the bands 15 and extending forwardly and upwardly therefrom to a raised border wire 23 extending laterally of the seat and above the front spring frame rod. The number and spacing of the suplementary spring rods 22 may be varied and, as shown in FIG. 1, the rods 22 are attached to alternate bands 15.

The supplementary spring rods 22 may be attached at their inner ends to the bands 15 by providing an offset bend portion 24 in each rod near its inner end and inserting the inner end portion 25 of the rod through a hole 26 in the band so that the portion 25 lies against the underside of the band while the offset portion 24 is engaged in the hole. From the offset bend 24 the rod 22 curves forwardly upward and preferably at its front end is provided with a right-angled bent portion 22' which abuts the border wire 23 and may be attached thereto by welding, as indicated at 27, or by other means.

As seen in FIG. 3, a conventional deck is applied to the top of the spring suspension by applying a layer of padding 28 over the tops of the bands 15 and over the supplementary front spring rods 22, the padding being held in place by fabric 30 which may be tied at 31 to the springs 22 and extends therefrom forwardly over the border wire 23 and then downwardly over and under the front seat frame member 10. The front portion 30' of the fabric closes the gap between the border wire 23 and seat frame and is preferably fastened to the seat frame member at 32 and 33 to provide a finished appearance and to assist in maintaining the front end of the suspension in place. The finished deck is adapted to support the usual stuffed seats indicated in phantom lines.

The supplementary spring rods 22 provide a simple and inexpensive, yet extremely effective means for resiliently supporting a raised soft front edge for the main spring suspension, without interfering with the action and support of the main spring seat. Moreover, the novel front edge construction is easily and quickly applied to seats of various widths, and is adapted to cooperate with the main suspension to provide a conventional upper deck for supporting stuffed or foam filled upholstered seats.

We claim:

1. In a spring seat suspension comprising a base, a spring frame having front and rear spring rods supported on said base, spaced resilient bands connecting said rods, and at least one bowed spring compression rod extending between and having its ends abutting said front and rear spring rods, the improvement comprising supplementary spring members each having its inner end fastened to one of said bands at a point spaced inwardly of said front spring rod, and its outer end located above said front spring rod for attachment to a border wire defining a raised front edge of the suspension.

2. The improvement in a spring seat suspension as defined in claim 1, in which the inner ends of said spring members penetrate the bands and terminate in offset linear portions lying under the bands.

3. The improvement in a spring seat suspension as defined in claim 1, in which said spring members have right-angled outer end portions for attachment to a laterally extending border wire.

4. The improvement in a spring seat suspension as defined in claim 2, in which said spring members have right-angled outer end portions for attachment to a laterally extending border wire.

5. The improvement in a spring seat suspension as defined in claim 1, in which upholstering material extends continuously from the outer ends of said supplementary spring members downwardly in front of said front spring rod and said base.

6. The improvement in a spring seat suspension as defined in claim 4, in which upholstering material extends continuously from the outer ends of said supplementary spring members downwardly in front of said front spring rod and said base.

References Cited

UNITED STATES PATENTS

| | | | |
|---|---|---|---|
| 2,133,747 | 10/1938 | Hunter | 267—112 X |
| 3,057,613 | 10/1962 | Benjamin | 267—103 |
| 3,165,308 | 1/1965 | Rathbun | 267—111 |
| 3,367,648 | 2/1968 | Richardson et al. | 267—112 |
| 3,375,861 | 4/1968 | Marlow | 160—371 |

CASMIR A. NUNBERG, Primary Examiner

U.S. Cl. X.R.

267—111; 297—456